Patented Aug. 3, 1926.

1,594,867

UNITED STATES PATENT OFFICE.

ARTHUR ZITSCHER, OF OFFENBACH-ON-THE-MAIN, GERMANY, ASSIGNOR TO I. G. FARBENINDUSTRIE AKTIENGESELLSCHAFT, OF FRANKFORT-ON-THE-MAIN, GERMANY.

MONOACYLACETYL BODIES CONTAINING AZO OR AZOXY GROUPS AND PROCESS OF MAKING SAME.

No Drawing. Application filed June 7, 1923, Serial No. 644,065, and in Germany May 3, 1923.

My invention relates to new monoacylacetylbodies of the general formula:

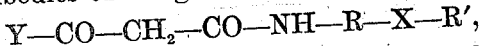

wherein Y represents any radicle of the hydrocarbon series containing at least one and not more than six carbon atoms. R an aryl residue, R' an aromatic residue, and X an azo or azoxy group.

Under the term "an aromatic residue" for R' I include a carbo- or heterocyclic aromatic residue, substituted or not, as well the residue of an acyclic body containing a methylene group capable of combining.

The new bodies are obtained by heating acetoacetic acid ester or its homologs or analogs, such as benzoylacetic acid ester, with monoaminobases corresponding to the formula, above mentioned, preferably in a solvent or diluent.

As such aminoazo- or -azoxycompound may be mentioned aminoazobenzene and -toluene, aminoazoxybenzene, the chlorinated and nitrated aminoazobenzenes, aminophenylazonaphthalene, benzeneazonaphthylamin, also aminoazocompounds, which can be obtained by combining diazotized monoacyldiamins or nitroamins respectively of the aromatic series with e. g. phenols or with bodies containing a methylene group, capable of combining, such as pyrazolones, or derivatives of β-ketonaldehyde, e. g. acetylacetone, derivatives of acetoacetic acid and the like, and by subsequently saponifying or reducing respectively the products obtained.

The new bodies may be used as primary products for the manufacture of dyestuffs, and they possess in a surprising manner the character of a substantive body making possible their fixation on the cotton fiber in alkaline solution and the development with diazocompounds to valuable shades, fast to washing.

The following examples illustrate the invention, the parts being by weight.

Example 1.

A solution of 24.7 parts of benzene-azo- 1-naphthylamin in 75 parts of acetoacetic acid ester is poured into 100 parts of boiling acetoacetic acid ester, then the mixture is heated to boiling, until the splitting off of alcohol is finished, and allowed to cool down. The resulting pulp of crystals is filtered, washed with ether or carbon tetrachloride and dried. The -N-acetoacetyl-benzene-azo-1-naphthylamin, thus obtained, is crystallized from alcohol in orange-colored, fine needles, melting at 154–155° (not corrected) with feeble decomposition. It is soluble in alcohol, insoluble in ether. This product has the formula:

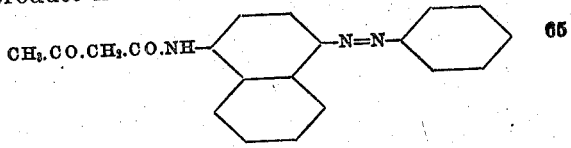

Example 2.

39 parts of acetoacetic acid ester are run into a boiling solution of 19.7 parts of 4-amino-azobenzene in 250 parts of chlorobenzene while stirring. The mixture is kept boiling, until the reaction is finished, and the -N-acetoacetyl-4-aminoazobenzene is isolated in the above described manner. Crystallized from dilute alcohol it forms a yellowish orange-colored, finely crystalline powder, melting at 130–131° (not corrected). It is soluble in acetic acid ester, alcohol and ether, insoluble in carbon tetrachloride. This product has the formula:

Example 3.

A solution of 29.3 parts of 4'-aminobenzene-azo-1-phenyl-3-methyl-5-pyrazolone in 200 parts of acetoacetic acid ester is poured in 150 parts of boiling acetoacetic acid ester, the mixture is then heated to boiling, until the reaction is finished, and the product of reaction is worked up in the described manner. The -N-acetoacetyl-4'-aminobenzene-azo-1-phenyl-3-methyl-5-pyrazolone is obtained as an orange-yellow, lustrous crystalline powder, decomposing at 208° (not corrected). Crystallized from acetonitril it forms orange-yellow, fine lustrous needles, having the same point of decomposition. It is soluble in alcohol and acetonitril, insoluble in ether. This product has the formula:

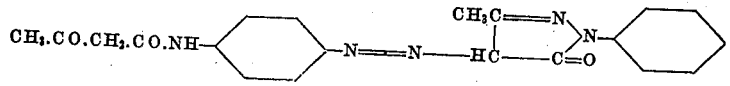

Instead of acetoacetic acid ester in each case its analogues such as benzoylacetic acid ester may be used.

The following table gives the properties of some others of the compounds obtainable according to the present process:

| -N-acetoacetyl-body from— | Aspect. | Crystallized from— | Melting point °C. not corrected. | Solubility. |
|---|---|---|---|---|
| Ortho-aminoazo-toluene | Orange-yellow, fine needles. | Dilute alcohol | 147° | Soluble in alcohol and glacial acetic acid, insoluble in ether. |
| Meta-aminoazo-toluene | Orange-colored, opalescent tiny scales. | Dilute alcohol | 133-134° | Soluble in alcohol and glacial acetic acid, insoluble in ether. |
| 4'-chloro-4-amino-azo-benzene | Orange-yellow, fine, clung needles. | Dilute alcohol | 188° | Soluble in alcohol and glacial acetic acid, insoluble in ether. |
| 3'-nitro-4-amino-azo-benzene | Orange-yellow, fine, clung needles. | Acetoacetic acid ester. | 138° under feeble decomposition. | Soluble in alcohol, glacial acetic acid and acetoacetic acid ester, insoluble in ether. |
| 4'-nitro-4-amino-azo-benzene | Orange-red, lustrous scales. | Acetoacetic acid ester. | 190-191° under decomposition. | Soluble in alcohol and glacial acetic acid, insoluble in ether. |
| 4-aminoazoxybenzene (isomeric B, melting at 114°—compare Chem. Centralblatt, 1921, III, page 780). | Feebly yellow little sheets. | Dilute alcohol. | 138° under decomposition. | Soluble in alcohol and glacial acetic acid, insoluble in ether. |
| 4'-amino-2'-methyl-benzene-azo-2-naphthalene. | Orange-yellow, conglobate aggregates. | Dilute alcohol. | 153-154° | Soluble in alcohol and glacial acetic acid, less soluble in ether. |
| 4'-aminobenzene-azo-para-cresol. | Clusters of orange-yellow needles. | Aceto-nitril | 165° | Soluble in alcohol, glacial acetic acid and acetonitril, insoluble in ether. |

The N-acetoacetyl body from 4-aminoazoxybenzene has the formula:

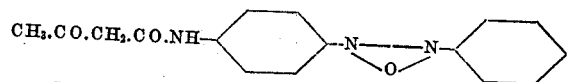

Now what I claim and desire to secure by Letters Patent is the following:

1. As new articles monoacylacetylbodies of the general formula:

Y—CO—CH$_2$—CO—NH—R—X—R', wherein Y represents any radicle of the hydrocarbon series containing at least one and not more than six carbon atoms, R an aryl residue, R' an aromatic residue, and X an azo or azoxy group, which are when dry yellow to red crystalline powders, soluble in dilute caustic soda solution.

2. A process of making new monoacylacetylbodies consisting in heating acylacetic acid esters with monoaminobases having the general formula:

NH$_2$—R—X—R', wherein R represents an aryl residue, R' an aromatic residue, and X an azo or azoxy group.

3. As new articles monoacetoacetylbodies of the general formula:

CH$_3$—CO—CH$_2$—CO—NH—R—N=N—R', wherein R represents an aryl residue, R' an aromatic residue, which are when dry yellow to red crystalline powders, soluble in dilute caustic soda solution.

4. A process of making new monoacetoacetylbodies consisting in heating acetoacetic acid ester with monoaminobases having the general formula:

NH$_2$—R—N=N—R', wherein R represents an aryl residue, R' an aromatic residue.

5. A process of making new monoacetoacetylbodies which consists in heating acylacetic acid esters with monoaminobases having the general formula:

NH$_2$—R—X—R', wherein R represents an aryl residue, R' an aromatic residue, and X an azo or azoxy group, in a diluent.

6. A process of making new monoacetoacetylbodies which consists in heating acetoacetic acid ester with monoaminobases having the general formula:

NH$_2$—R—N=N—R', wherein R represents an aryl residue, and R' an aromatic residue, in a diluent.

In testimony, that I claim the foregoing as my invention, I have signed my name, this 23rd day of May 1923.

ARTHUR ZITSCHER. [L. S.]